United States Patent [19]
Kajimoto et al.

[11] 3,899,445
[45] *Aug. 12, 1975

[54] CATALYST FOR OXIDATION OF ETHYLENE TO ETHYLENE OXIDE

[75] Inventors: Tsunesuke Kajimoto; Shigeru Wakamatsu, both of Kamakura, Japan

[73] Assignee: Toray Industries, Inc., Tokyo, Japan

[ * ] Notice: The portion of the term of this patent subsequent to Sept. 17, 1991, has been disclaimed.

[22] Filed: Jan. 8, 1973

[21] Appl. No.: 321,911

Related U.S. Application Data

[63] Continuation-in-part of Ser. No. 258,522, June 1, 1972, Pat. No. 3,838,481.

[52] U.S. Cl.............. 252/462; 252/476; 260/348.5 R
[51] Int. Cl............................................... B01j 11/08
[58] Field of Search....... 252/462, 476; 260/348.5 R

[56] References Cited
UNITED STATES PATENTS

| | | | |
|---|---|---|---|
| 2,615,899 | 10/1952 | Sears............................ | 260/348.5 R |
| 2,615,900 | 10/1952 | Sears............................ | 260/348.5 R |
| 3,144,416 | 8/1964 | Hosoda et al...................... | 252/476 |
| 3,205,280 | 9/1965 | Wattimena et al. ............ | 252/462 X |

OTHER PUBLICATIONS

Bijvoet et al., "Rare–Earth Metals in Silver," Solid State Communications, Vol. 4, 1966, pp. 455–458.

*Primary Examiner*—W. J. Shine

[57] ABSTRACT

A silver catalyst composition containing, as a moderator, at least one metal selected from the group consisting of praseodymium, neodymium, terbium and dysprosium gives high selectivity in the oxidation of ethylene by molecular oxygen to ethylene oxide.

17 Claims, No Drawings

CATALYST FOR OXIDATION OF ETHYLENE TO ETHYLENE OXIDE

This is a continuation-in-part of our co-pending U.S. Pat. application Ser. No. 258,522, filed June 1, 1972, now U.S. Pat. No. 3,838,481.

This invention relates to a catalyst composition, and to a method for oxidation of ethylene by molecular oxygen to ethylene oxide. More particularly, it relates to a silver catalyst containing a specified moderator and to a method using said silver catalyst. In a commercial process for the production of ethylene oxide, ethylene is oxidized with gases containing molecular oxygen in the presence of silver as a catalyst. In this oxidation reaction, it is important to control the undesired side reactions, especially the oxidation of ethylene to carbon dioxide and water. A silver catalyst for the commercial oxidation of ethylene to ethylene oxide has been chosen to give high selectivity for the production of ethylene oxide, in addition to high catalytic activity and long catalytic life. In order to improve the selectivity of silver catalyst for the oxidation of ethylene to ethylene oxide, various kinds of moderators such as sulfur, iodine, chlorine, lead and platinum have been proposed to be added to the silver catalyst. Some of these catalysts have been used for the industrial production of ethylene oxide by the oxidation of ethylene. However, the selectivity of even these conventional modified silver catalysts is not necessarily satisfactory, and further improvement has been desired.

We have found that the selectivity of the oxidation reaction of ethylene to ethylene oxide with silver catalyst contains, as a moderator, one or more selected rare earth metals, especially praseodymium, neodymium, terbium and dysprosium. In U.S. Pat. No. 2,615,899 silver catalyst with additives of lanthanum, cerium or samarium compounds is disclosed, but in this patent nothing is disclosed about the improvement, if any, in selectivity of the silver catalyst by the addition of these rare earth metals, and no data on the conversion and selectivity of ethylene oxidation are shown.

The catalyst composition of the present invention contains, as a moderator, at least one metal selected from the group consisting of praseodymium, neodymium, terbium and dysprosium. The amount of the rare earth metal is usually 0.001 to about 5.0 atomic %, preferably 0.01 to about 1 atomic % on the basis of silver atoms. Among rare earth metals the above four metals have a remarkable effect as a moderator for the silver catalyst in the oxidation of ethylene to ethylene oxide. These four metals are actually superior as a moderator to, for example, lanthanum which is used in U.S. Pat. No. 2,615,899.

The silver catalyst, which is the main component of the catalyst composition of this invention, may be silver and/or silver oxide which can be prepared from various silver compounds such as silver oxide, silver nitrate, silver carbonate, silver lactate and so on.

The selected rare earth metals used in the present invention can be added to the silver catalyst in the form of the metal itself or compounds thereof. The compounds may be oxides, chlorides, bromides, iodides, hydroxides, sulfates, carbonates, nitrates, oxychlorides, lactates, oxalates, acetates, acetyl acetonates, or phenolates of these rare earth metals. The rare earth metals are preferably dispersed on or in the silver catalyst as uniformly as possible.

The catalyst composition can be prepared by the application of conventional methods to prepare the catalyst which contains moderators or additives. The selected rare earth metals may be either added to a previously prepared silver catalyst or added at the time of preparation of the silver catalyst. In the former case, it is preferable to treat the previously prepared catalyst with a solution or slurry containing the selected rare earth metals.

The catalyst composition may be used without a carrier, but from the practical point of view the catalyst composition is preferably supported on a carrier.

The preferable methods for the preparation of the catalyst composition of this invention can be exemplified as follows.

A catalyst composition may be prepared by impregnating a porous carrier with a solution of a silver salt and a salt of at least one metal selected from the group consisting of praseodymium, neodymium, terbium and dysprosium, and thereafter evaporating the solvent from the mixture as the solution is stirred. Then the catalyst is activated by heating at between 100° and 500°C to dry the carrier. In this method, the solution may preferably contain at least one salt of alkali or alkaline earth metal, most preferably barium lactate and barium nitrate, in addition to the silver salt and the rare earth metal salt.

As the silver salt, silver lactate is preferably used, and as the salt of the rare earth metal, lactate or nitrate are preferably used.

As a solvent, water is preferable, but other solvents such as methanol, ethanol, acetone and methyl ethyl ketone can be used with or without water.

Another type of catalyst composition is prepared by coating a carrier with a slurried solution which contains silver oxide and a salt of at least one metal selected from the group consisting of praseodymium, neodymium, terbium and dysprosium, and thereafter drying the coated carrier and furthermore activating it by heating between 200° and 500°C. As the salt of the rare earth metal, lactate and nitrate are preferably used. A salt of alkali or alkaline earth metal may be futher added to the slurried solution, and barium lactate and calcium lactate are preferably as such a salt. Water is preferably used as a solvent and other solvents such as methanol, ethanol, acetone and methyl ethyl ketone can be used with or without water.

The third type of catalyst composition is prepared by coating a carrier with a slurried solution which contains a reduced silver and a salt of at least one metal selected from the group consisting of praseodymium, neodymium, terbium and dysprosium, and drying the coated carrier. This type of the catalyst does not require any specific activation step.

In a preferable embodiment of this type, the reduced silver is coated with a salt of the said rare earth metal as follows:

There is prepared a dispersion of reduced silver in an aqueous solution of a soluble rare earth metal salt such as chloride, nitrate and lactate. To this dispersion is added an aqueous solution of alkali or alkaline earth metal hydroxide, whereby the soluble rare earth salt is converted to an insoluble hydroxide and is precipitated on the reduced silver.

The reduced silver, thus coated with rare earth metal hydroxide, is then filtered and washed with water and preferably dried.

As the preferred alkali or alkaline earth metal hydroxide, sodium hydroxide, lithium hydroxide, potassium hydroxide and barium hydroxide are used.

The reduced silver used in the thid method for preparation of catalyst composition may be produced by a conventional method of reduction. For example, a reduced silver may be obtained by the reduction of silver oxide with formalin in an aqueous alkaline solution.

The reduced silver coated with the rare earth metal, which is obtained above, is immersed into a solvent and a slurried solution is thereby prepared. The slurried solution may preferably contain a salt of alkali or alkaline earth metal such as barium nitrate, barium lactate, calcium nitrate and calcium lactate. The solvent is preferably water, but other solvents such as methanol, ethanol, acetone and methyl ethyl ketone can be used with or without water.

Into the slurried solution thus obtained, a carrier is added and while stirring, the solvent is evaporated to give a dry carrier coated with silver catalyst.

In all these methods for the preparation of the silver catalyst of this invention, various kinds of carriers known as conventional for silver catalysts generally can be adopted. Examples of carriers suitable for the catalyst composition of this invention are fused alumina, corundum, silica, silica alumina, silicon, silicon carbide, fused beryllium, magnesium-alumina spinel, sintered diatomaceous earth, brick pumice, graphite, silicon iron, silver plate and aluminum powder. Preferably, the carrier has surface area in the range of 0.001 to 10 m$^2$/g. The shape of the carrier is preferably spherical, but it may have other shapes.

The supported catalyst composition thus obtained may be further activated by heating at an elevated temperature or contacting with a gas containing oxygen, hydrogen, ethylene, helium, nitrogen or a small amount of chlorine or chlorine containing compounds.

In the oxidation of ethylene with the silver catalyst composition of this invention, conventional reaction conditions can be used. The reaction can be carried out under atmospheric or at elevated pressure in the vapor phase. Preferable pressure is in the range of 5 to 30 Kg/cm$^2$. The reaction temperature is in the range of 150° to 350°C, preferably 190° to 280°C. The optimum reaction temperature is variable according to the activity of the catalyst composition. A gaseous mixture containing ethylene and molecular oxygen is fed to the catalyst bed containing the above described catalyst composition and kept at a temperature in the range described above. The preferred source of molecular oxygen is air. In addition to air, the feed gas mixture also preferably contains 0.5 to 10 volume % of ethylene. It is advantageous to use oxygen in excess of that stoichiometrically required; for example up to 50 mole percent excess, with reference to ethylene may be used.

The feed gas mixture may also contain a small amount of halogen compound (such as dichloreothane, dibromoethane and diphenyl chloride), tetraethyl lead, benzene, ethanol, ozone and hydrogen peroxide. Carbon dioxide may also be contained in the feed gas. From the gas mixture following the reaction in the catalyst bed, the ethylene oxide is separated by a conventional method, for example by washing with water. After the ethylene oxide has been accumulated in wash water in this manner, it is isolated by fractional distillation. The residual gas may be recycled to the reaction zone after it has been enriched with ethylene and oxygen.

The following examples are introduced for the purpose of illustration of the present invention with no intention to limit the scope of the same.

As used in the following examples, the terms "selectivity" and "conversion" are defined by following formulae, $$\text{selectivity } (\%) = \frac{\text{mol of ethylene oxide produced}}{\text{mol of ethylene reacted}} \times 100$$

$$\text{conversion}(\%) = \frac{\text{mol of ethylene reacted}}{\text{mol of ethylene fed}} \times 100$$

EXAMPLE 1

A thousand parts of silver oxide was added to 1200 parts of 90% aqueous solution of lactic acid with stirring over a period of about 30 minutes at 85° to 95°C. To this mixture, 50 parts of 30% aqueous solution of hydrogen peroxide was slowly added, and then 272 parts of barium lactate and 7 parts of praseodymium lactate were added.

A thousand parts of catalyst support particle (3/16 inch spherical particles, Alundum; SA5103, Norton Co.) was immersed in the above obtained solution which was heated at 90° to 95°C. After 15 minutes with occasional stirring, the impregnated support particles were filtered and then dried for 12 hours at 65°C in the oven. Afterward, the dried impregnated particles were heated gradually over a period of 4 hours to 250°C and maintained at this temperature for 5 hours. The catalyst, thus obtained, contained 11.5 wt.% silver. The atomic percentages of barium and praseodymium in respect to silver were 10% and 0.2% respectively.

The oxidation of ethylene with this catalyst was carried out in a ½ inch diameter cylindrical stainless-steel reactor. A gaseous mixture containing 5% ethylene, 5% carbon dioxide and the balance air was passed over this catalyst at a space velocity of 1,200 hr$^{-1}$. The temperature of the catalyst bed was kept at 240°C.

The analysis of the effluent gas after 235 hours showed that the conversion of the reaction was 24% and the selectivity was 73% as shown in Table 1.

Table 1

The oxidation of ethylene with silver catalysts containing rare earth metals.

| Example number | Rare earth metal (%) | Reaction temperature (°C) | Reaction time (hr.) | Conversion (%) | Selectivity (%) |
|---|---|---|---|---|---|
| 1 | Pr (0.2) | 240 | 235 | 24 | 73 |
| 2 | Nd (0.2) | 240 | 235 | 22 | 74 |
| 3 | Tb (0.2) | 240 | 235 | 27 | 73 |
| 4 | Dy (0.2) | 240 | 235 | 22 | 74 |
| 5 | Pr (0.002) | 240 | 235 | 25 | 70 |
| 6 | Pr (0.01) | 240 | 235 | 25 | 72 |

Table 1 – Continued

The oxidation of ethylene with silver catalysts containing rare earth metals.

| Example number | Rare earth metal (%)* | Reaction temperature (°C) | Reaction time (hr.) | Conversion (%) | Selectivity (%) |
| --- | --- | --- | --- | --- | --- |
| 7 | Pr (0.5) | 240 | 235 | 22 | 70 |
| 8 | Pr (0.1) | 240 | 235 | 23 | 71 |
| 9 | Pr (0.2) | 240 | 235 | 25 | 72 |
| 10 | Pr (0.2) | 240 | 235 | 28 | 70 |
| Comparative 1 | — | 240 | 234 | 26 | 62 |
| Comparative 2 | La (0.2) | 240 | 235 | 28 | 66 |

* The atomic percentages of rare earth metals in respect to silver.

EXAMPLES 2 to 4

Three catalysts were prepared by the same method as described in Example 1 except that neodymium, terbium and dysprosium lactates were used in place of praseodymium lactate. The atomic percentage of each rare-earth metal in respect to silver was adjusted to 0.2%. The results of oxidation of ethylene with the use of these catalysts are also shown in Table 1.

EXAMPLES 5 to 7

Three catalysts were prepared by the same method as described in Example 1 except that the amount of praseodymium of each catalyst was adjusted to 0.002, 0.01 and 0.5 atomic percent, respectively, in respect to silver. The results of oxidation of ethylene with these catalysts are also shown in Table 1.

EXAMPLE 8

A catalyst was prepared by the same method as described in Example 1 except that praseodymium nitrate was used in place of praseodymium lactate and the atomic percentage of praseodymium was adjusted to 0.1% in respect to silver. The results of oxidation of ethylene with this catalyst are shown in Table 1.

EXAMPLE 9

A catalyst was prepared by the same method as described in Example 1 except that barium nitrate was used in place of barium lactate and the atomic percentage of barium was adjusted to 4% in respect to silver. The results of oxidation of ethylene with this catalyst are shown in Table 1.

EXAMPLE 10

A catalyst was prepared by the same method as described in Example 1 except that no barium lactate was used and the atomic percentage of praseodymium was adjusted to 5.0% in respect to silver. The results of oxidation of ethylene with this catalyst are shown in Table 1.

COMPARATIVE EXAMPLES 1 AND 2

A catalyst was prepared by the same method as described in Example 1 except that no praseodymium lactate was added.

Another catalyst was prepared by the same method as Example 1 except that same amount of lanthanum lactate was added in place of praseodymium lactate. The results of oxidation of ethylene with these catalysts are also shown in Table 1 for comparison.

EXAMPLE 11

In 1,000 parts of water were dissolved 109 parts of calcium lactate and 4 parts of praseodymium lactate. To this solution 372 parts of silver oxide was added and mixed well. To this suspension 1733 parts of the catalyst support particles (⅛ inch × ⅛ inch pellet, Mulnorite; BK 219, Norton Co.) was added and dried at 100° to 110°C with stirring for 5 hours and afterward heated up to 350°C and kept at this temperature for 3 hours to give a catalyst, which contained 0.3 atomic percent of praseodymium and 15.6 atomic percent of calcium in respect to silver.

The catalyst was placed in a ½ inch diameter V-shaped stainless-steel reactor which was immersed in an oil bath. The temperature of the catalyst bed was controlled at 220°C. To this reactor a gaseous mixture of 95% air and 5% ethylene was passed at a space velocity of 1,200 hours. The analysis of the effluent gas after 235 hours reaction showed the conversion was 27% and the selectivity was 69%.

EXAMPLES 12 to 14

Three catalysts were prepared by the same method as described in Example 11 except that neodymium, terbium and dysprosium lactates were used in place of praseodymium lactate. The atomic percentage of each rare-earth metal was adjusted to 0.3% in respect to silver. The results of oxidation of ethylene with these catalyst are shown in Table 2.

Table 2

The Oxidation of Ethylene with Silver Catalysts Containing Rare earth Metals.

| Example number | Rare earth metal (%)[a] | Reaction temperature (°C) | Reaction time (hr.) | Conversion (%) | Selectivity (%) |
| --- | --- | --- | --- | --- | --- |
| 11 | Pr (0.3) | 220 | 235 | 27 | 69 |
| 12 | Nd (0.3) | 220 | 235 | 25 | 72 |
| 13 | Tb (0.3) | 220 | 235 | 31 | 69 |
| 14 | Dy (0.3) | 220 | 235 | 24 | 72 |
| 15 | Pr (0.05) | 220 | 235 | 29 | 72 |
| 16 | Pr (0.1) | 220 | 235 | 28 | 71 |
| 17[b] | Pr (0.3) | 220 | 235 | 18 | 71 |
| 18[c] | Pr (0.3) | 220 | 235 | 25 | 70 |
| 19[d] | Pr (0.3) | 220 | 235 | 19 | 70 |
| 20 | Pr (0.3) | 220 | 235 | 35 | 69 |
| Comparative 3 | — | 220 | 211 | 29 | 62 |
| Comparative 4 | La (0.3) | 220 | 235 | 31 | 66 |

[a] The atomic percentages of rare earth metals in respect to silver.
[b] $Ba(C_3H_5O_3)_2$.
[c] $Ca(NO_3)_2$.
[d] $Ba(NO_3)_2$.

EXAMPLE 15

A catalyst was prepared by the same method as described in Example 11 except that the amount of praseodymium was adjusted to 0.05 atomic % in respect to silver. The results of oxidation of ethylene with this catalyst are shown in Table 2.

EXAMPLE 16

A catalyst was prepared by the same method as described in Example 11 except that praseodymium nitrate was used in place of praseodymium lactate and the amount of praseodymium was adjusted to 0.1 atomic % in respect to silver. The results of oxidation of ethylene with this catalyst are shown in Table 2.

EXAMPLES 17 TO 19

Three catalysts were prepared by the same method as described in Example 11 except that barium lactate, calcium nitrate and barium nitrate was used in place of calcium lactate and the amount of each alkaline earth metal was adjusted to 10% in respect to silver. The results of oxidation of ethylene with these three catalysts are shown in Table 2.

EXAMPLE 20

A catalyst was prepared by the same method as Example 11 except that no calcium lactate was added. The results of oxidation of ethylene with the catalyst are shown in Table 2.

COMPARATIVE EXAMPLES 3 AND 4

A catalyst for comparison was prepared by the same method as Example 11 except that no praseodymium lactate was added.

Another catalyst for comparison was prepared by the same method as described in Example 11 except that same amount of lanthanum lactate was added in place of praseodymium lactate. The results of oxidation of ethylene with these catalysts are shown in Table 2.

EXAMPLE 21

In 800 parts of water 63.5 parts of sodium bicarbonate was dissolved and 108 parts of silver oxide was added. Forty-five parts of formalin (37%) was diluted with 500 parts of water and the solution was added dropwise to the above sodium bicarbonate solution with stirring. After the addition of the formalin solution was over, the precipitate of reduced silver was filtered, washed with distilled water and dried.

By the following procedure, praseodymium hydroxide was coated on the reduced silver.

In 1,000 parts of water 0.123 parts of praseodymium chloride was dissolved and 108 parts of reduced silver was added. To this mixture 120 parts of 0.5% aqueous solution of sodium hydroxide was added with stirring and kept stirring for 5 minutes, then the silver powder was filtered, washed with distilled water and dried. The atomic percentage of praseodymium in respect to silver was 0.05%.

In 300 parts of water 10.5 parts of barium nitrate was dissolved at 90°C and to this solution 108 parts of silver powder coated with praseodymium hydroxide was added and mixed well. Four hundred parts of catalyst support particles (⅛ inch × ⅛ inch pellet, Alundum, SA5103, Norton Co.) was added to the above suspension and dried at 105° to 110°C with stirring to give a catalyst.

The catalyst was placed in a ½ inch diameter U-shaped glass reactor which was immersed in an oil bath. The temperature of the catalyst bed was controlled at 240°C. To this reactor a gaseous mixture of 95% air and 5% ethylene was passed at a space velocity of 1,200 $hr^{-1}$. The analysis of the effluent gas after 195 hours showed the conversion was 23% and the selectivity was 73% as shown in Table 3.

EXAMPLES 22 TO 24

Three catalysts were prepared by the same method as described in Example 21 except that neodymium, terbium and dysprosium chlorides were used in place of praseodymium chloride. The atomic percentage of each lanthanide metal in respect to silver was 0.05%. The results of oxidation of ethylene with these catalysts are shown in Table 3.

EXAMPLES 25 TO 28

Four catalysts were prepared by the same method as described in Example 21 except that the atomic percentage of praseodymium in each catalyst was adjusted to 0.02, 0.1, 0.5 and 1.0% respectively in respect to silver, wherein the amount of sodium hydroxide added was also changed proportionately. The results of oxidation of ethylene with these catalysts are shown in Table 3.

Table 3

The Oxidation of Ethylene with silver Catalysts Containing Rare earth Metals.

| Example number | Rare earth metal (%)[a] | Reaction temperature (°C) | Reaction time (hr.) | Conversion (%) | Selectivity (%) |
|---|---|---|---|---|---|
| 21 | Pr (0.05) | 240 | 195 | 23 | 73 |
| 22 | Nd (0.05) | 240 | 195 | 21 | 74 |
| 23 | Tb (0.05) | 240 | 195 | 28 | 73 |
| 24 | Dy (0.05) | 240 | 195 | 21 | 74 |
| 25 | Pr (0.02) | 240 | 235 | 24 | 71 |
| 26 | Pr (0.1) | 240 | 235 | 24 | 74 |
| 27 | Pr (0.5) | 220 | 235 | 26 | 72 |
| 28 | Pr (1.0) | 210 | 235 | 27 | 71 |
| 29[b] | Pr (0.05) | 240 | 235 | 27 | 74 |
| 30[c] | Pr (0.05) | 240 | 235 | 23 | 72 |
| 31[d] | Pr (0.05) | 240 | 235 | 19 | 75 |
| 32 | Pr (0.2) | 240 | 195 | 25 | 71 |
| 33 | Pr (2.0) | 220 | 235 | 18 | 69 |
| 34 | Pr (2.0) | 220 | 235 | 21 | 70 |
| 35 | Pr (2.0) | 220 | 235 | 21 | 69 |
| Comparative 5 | — | 240 | 195 | 26 | 61 |
| Comparative 6 | La (0.05) | 240 | 195 | 27 | 65 |

[a] The atomic percentages of rare earth metals in respect to silver.
[b] LiOH
[c] KOH
[d] RbOH

EXAMPLES 29 TO 31

Three catalysts were prepared by the same method as described in Example 21 except that in place of sodium hydroxide lithium, potassium and barium hydroxides were used respectively. The results of oxidation of ethylene with these catalysts are shown in Table 3.

EXAMPLE 32

Silver powder coated with praseodymium hydroxide was prepared by the same method as described in Example 21 except that praseodymium nitrate was used in place of praseodymium chloride, wherein the atomic percentage of praseodymium in respect to silver was adjusted to 0.2%. With the use of this silver coated with praseodymium hydroxide a catalyst was prepared by the same method as Example 21 except that calcium nitrate was used in place of barium nitrate, wherein the atomic percentage of calcium in respect to silver was adjusted to 4.0%. The results of oxidation of ethylene with this catalyst are shown in Table 3.

EXAMPLE 33

Silver powder coated with praseodymium hydroxide was prepared by the same method as described in Example 21 except that praseodymium lactate was used in place of praseodymium chloride, wherein the atomic percentage of praseodymium in respect to silver was adjusted to 2.0%. With the use of this silver coated with praseodymium hydroxide a catalyst was prepared by the same method as Example 21 except that barium lactate was used in place of barium nitrate, wherein the atomic percentage of barium in respect to silver was adjusted to 4.0%. The results of oxidation of ethylene with this catalyst are shown in Table 3.

EXAMPLE 34

A catalyst was prepared by the same method as described in Example 33 except that calcium lactate was used in place of barium lactate and the atomic percentage of calcium was adjusted to 4.0% in respect to silver. The results of oxidation of ethylene with this catalyst are shown in Table 3.

EXAMPLE 35

A catalyst was prepared by the same method as described in Example 34 except that no calcium lactate was used. The results of oxidation of ethylene with this catalyst are shown in Table 3.

COMPARATIVE EXAMPLES 5 AND 6

A catalyst for comparison was prepared by the same method as in Example 21 except that coating with praseodymium hydroxide was not performed and reduced silver was used directly in place of silver powder coated with praseodymium hydroxide.

Another catalyst for comparison was prepared by the same method as Example 21 except that lanthanum chloride was used in place of praseodymium chloride. The results of oxidation of ethylene with these catalysts are shown in Table 3.

EXAMPLE 36

Fifty parts of a supported silver catalyst which was prepared by the same method as in Comparative Example 5 was immersed in 1,000 parts of water and to this 2 parts of $3 \times 10^{-3}$M aqueous solution of praseodymium chloride (0.01 atomic % in respect to silver) was added. Then to this solution 10 parts of 0.5% aqueous solution of potassium hydroxide was added with stirring, and stirring was continued for 5 minutes after the addition had been made. The catalyst was filtered, washed well with distilled water and dried at 115°C in air. The oxidation of ethylene with the use of this catalyst was carried out under the same condition as in Example 21. The analysis of the effluent gas after 195 hours showed that the conversion of the reaction was 15% and the selectivity was 69%.

We claim:

1. A catalyst composition for the oxidation of ethylene to ethylene oxide which comprises silver catalyst and, as a moderator, at least one rare earth metal selected from the group consisting of praseodymium, neodymium, terbium and dysprosium, which is prepared by coating a carrier with a slurried solution which contains reduced silver in the form of silver powder and a salt of at least one rare earth metal selected from the group consisting of praseodymium, neodymium, terbium and dysprosium and drying the coated carrier, wherein said reduced silver is prepared as silver powder by the chemical reaction of silver oxide in an aqueous solution, and wherein the reduced silver and the salt of the rare earth metal are previously combined by immersing the reduced silver into an aqueous solution of a soluble salt of said rare earth metal, adding thereto an aqueous solution of alkali or alkaline earth hydroxide thereby converting said soluble salt of said rare earth metal into the insoluble hydroxide and precipitating said insoluble hydroxide on the reduced silver, filtering off the combined reduced silver and precipitated rare earth metal hydroxide, and washing them with water.

2. A catalyst composition as claimed in claim 1 wherein the amount of the moderator is from 0.001 to about 5.0 atomic % on the basis of silver atoms.

3. A catalyst composition as claimed in claim 1 wherein the amount of the moderator is from 0.01 to 1.0 atomic % on the basis of silver atoms.

4. A catalyst composition as claimed in claim 1, wherein the reduced silver is prepared by the reduction of silver oxide with formalin in alkaline solution.

5. A catalyst composition as claimed in claim 1, wherein the soluble salt of the rare earth metal is chloride.

6. A catalyst composition as claimed in claim 1, wherein the soluble salt of the rare earth metal is nitrate.

7. A catalyst composition, as claimed in claim 1, wherein the soluble salt of the rare earth metal is lactate.

8. A catalyst composition, as claimed in claim 1, wherein the alkali metal hydroxide is sodium hydroxide.

9. A catalyst composition, as claimed in claim 1, wherein the alkali metal hydroxide is lithium hydroxide.

10. A catalyst composition, as claimed in claim 1, wherein the alkali metal hydroxide is potassium hydroxide.

11. A catalyst composition, as claimed in claim 1, wherein the alkaline earth metal hydroxide is barium hydroxide.

12. A catalyst composition, as claimed in claim 1, wherein the slurried solution further contains a salt of alkali or alkaline earth metal.

13. A catalyst composition, as claimed in claim 12, wherein the salt of alkaline earth metal is barium nitrate.

14. A catalyst composition, as claimed in claim 12, wherein the salt of alkaline earth metal is barium lactate.

15. A catalyst composition, as claimed in claim 12, wherein the salt of alkaline earth metal is calcium nitrate.

16. A catalyst composition, as claimed in claim 12, wherein the salt of alkaline earth metal is calcium lactate.

17. A catalyst composition, as claimed in claim 1, wherein the slurried solution is aqueous.

* * * * *